United States Patent
Shimizu et al.

(10) Patent No.: US 7,339,758 B2
(45) Date of Patent: Mar. 4, 2008

(54) ETCHING METHOD, A SUBSTRATE WITH A PLURALITY OF CONCAVE PORTIONS, A MICROLENS SUBSTRATE, A TRANSMISSION SCREEN AND A REAR PROJECTION

(75) Inventors: Nobuo Shimizu, Suwa (JP); Hideto Yamashita, Suwa (JP); Makoto Ishii, Suwa (JP)

(73) Assignee: Seiko Epson Corporation (JP)

( * ) Notice: Subject to any disclaimer, the term of this patent is extended or adjusted under 35 U.S.C. 154(b) by 316 days.

(21) Appl. No.: 11/019,994

(22) Filed: Dec. 21, 2004

(65) Prior Publication Data
US 2005/0141085 A1 Jun. 30, 2005

(30) Foreign Application Priority Data
Dec. 26, 2003 (JP) ............................. 2003-435268

(51) Int. Cl.
G03B 21/56 (2006.01)
G03B 21/60 (2006.01)
G02B 7/00 (2006.01)
B29D 11/00 (2006.01)
B44C 1/22 (2006.01)
H01L 21/00 (2006.01)

(52) U.S. Cl. .................. 359/896; 359/443; 359/454; 359/900; 216/24; 216/34; 438/43

(58) Field of Classification Search ............... 359/443, 359/454, 900, 836; 216/34, 24; 438/43
See application file for complete search history.

(56) References Cited

U.S. PATENT DOCUMENTS 6,363,603 B1* 4/2002 Nemoto et al. ............... 29/458

6,437,918 B1* 8/2002 Hamanaka et al. .......... 359/620
2003/0219935 A1* 11/2003 Miyairi et al. ............... 438/166
2004/0229169 A1* 11/2004 Sandstrom .................. 430/311

FOREIGN PATENT DOCUMENTS

| JP | 07-181672 | 7/1995 |
| JP | 08-220306 | 8/1996 |
| JP | 11-52426 | 2/1999 |
| JP | 11-135582 | 5/1999 |
| JP | 2000-281383 | 10/2000 |

(Continued)

OTHER PUBLICATIONS

Communication from Japanese Patent Office re: related application, May 12, 2002.

Primary Examiner—Diane I. Lee
Assistant Examiner—Magda Cruz
(74) Attorney, Agent, or Firm—Harness, Dickey & Pierce, P.L.C.

(57) ABSTRACT

An etching method is disclosed. The etching method includes the steps of: preparing a substrate 5; forming first and second films 61, 62 each having predetermined internal stress on the substrate so that the internal stresses of the first and second films 61, 62 are canceled out or reduced with each other; forming a plurality of initial holes 63 in the first and second films 61, 62 to form a mask 6; and forming a plurality of concave portions 3 in the substrate 5 at portions corresponding to the plurality of initial holes 63 by subjecting the substrate 5 to an etching process using the mask 6.

19 Claims, 4 Drawing Sheets

FOREIGN PATENT DOCUMENTS

| | | |
|---|---|---|
| JP | 2000-62173 | 2/2002 |
| JP | 2002-166557 | 6/2002 |
| JP | 2002-198495 | 7/2002 |
| JP | 2002-237601 | 8/2002 |
| JP | 2003-224265 | 8/2003 |

* cited by examiner

FIG. 1E
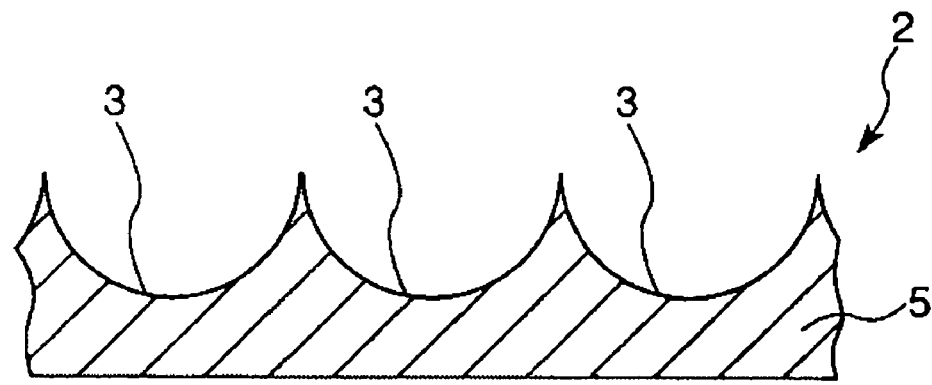
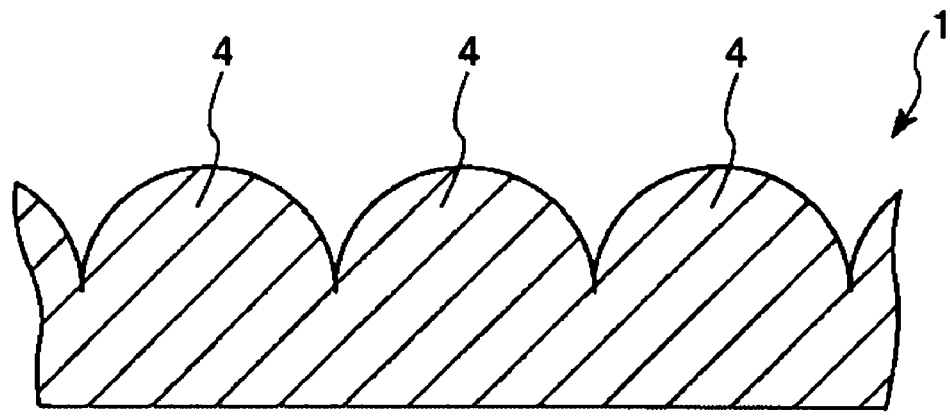
FIG. 2

ETCHING METHOD, A SUBSTRATE WITH A PLURALITY OF CONCAVE PORTIONS, A MICROLENS SUBSTRATE, A TRANSMISSION SCREEN AND A REAR PROJECTION

CROSS-REFERENCE TO RELATED APPLICATION

This application claims priority to Japanese Patent Application No. 2003-435268 filed Dec. 26, 2003, which is hereby expressly incorporated by reference herein in its entirety.

FIELD OF THE INVENTION

The present invention relates to an etching method, a substrate with concave portions, a microlens substrate, a transmission screen and a rear projection.

BACKGROUND OF THE INVENTION

For example, a transmission display that projects an image onto a screen is known. A liquid crystal panel (liquid crystal optical shutter) is used for producing an image in such a transmission display. This liquid crystal panel is constructed so that a liquid crystal driving substrate (TFT substrate) having a plurality of thin-film transistors (TFTs) for controlling respective pixels and a plurality of pixel electrodes is bonded to a facing substrate for a liquid crystal panel having a black matrix, a common electrodes and the like via a liquid crystal layer.

Since the black matrix is formed at a portion other than the portions corresponding to pixels of the facing substrate for a liquid crystal panel in the liquid crystal panel (TFT liquid crystal panel) having such a structure, the region where the incident light is transmitted in the liquid crystal panel is restricted. Thus, transmittance of the incident light is reduced. In order to increase the transmittance of the incident light, a liquid crystal panel in which a large number of minute microlenses are provided at portions corresponding to pixels in a facing substrate for a liquid crystal panel is known. The light transmitted by the facing substrate for a liquid crystal panel is condensed to openings formed on the black matrix, thereby increasing the transmittance of the light.

As a method of forming concave portions in a substrate to form such microlenses (herein, etching method), for example, a method in which a mask is used is known (see, for example, Japanese Laid-Open Patent Application No. 2000-281383). Heretofore, a constituent material of such a mask has been selected by focusing on adhesion to the substrate to be subjected to an etching process or the like. However, in this method, since a film for forming the mask with a plurality of openings has predetermined internal stress and the formed openings may be deformed, it is difficult to control the shape and the size of concave portions (concave portions for forming microlenses) in the substrate. Further, for this reason, it is difficult to improve resolution of an image that a transmission display obtained using a microlens substrate provided with the microlenses displays, for example.

SUMMARY OF THE INVENTION

It is therefore one object of the present invention to provide an etching method capable of forming concave portions each having desired shape and size readily and surely and a substrate with a plurality of concave portions manufactured using the etching method.

Further, it is another object of the present invention to provide a microlens substrate manufactured using the substrate with a plurality of concave portions, a transmission screen and a rear projection provided with the microlens substrate.

In order to achieve the above objects, in one aspect of the present invention, the present invention is directed to an etching method. The etching method of the present invention includes the steps of:

preparing a substrate;

forming first and second films each having predetermined internal stress on the substrate so that the internal stresses of the first and second films are canceled out or reduced with each other;

forming a plurality of initial holes in the first and second films to form a mask; and forming a plurality of concave portions in the substrate at portions corresponding to the plurality of initial holes by subjecting the substrate to an etching process using the mask.

This makes it possible to control the internal stress of the entire film for forming the mask having the first and second films and to form the initial holes each having desired shape and size with high dimensional accuracy. As a result, it is possible to control the shape and size of the concave portions readily and surely. Further, by forming (laminating) the first and second films in this manner, it is possible to improve adhesion of the mask to the substrate. Moreover, by adjusting the internal stress of the entire film for forming the mask having the first and second films, it is possible to control side etching rate during the etching process. Therefore, it is possible to form concave portions corresponding to spherical lenses or a spherical lenses readily.

In the etching method of the present invention, it is preferable that the first and second films forming step includes the steps of:

forming the first film on the substrate; and forming the second film on the first film.

This makes it possible to form the initial holes each having a desired size with high accuracy. As a result, it is possible to control the shape of concave portions more surely.

In the etching method of the present invention, it is preferable that the second film forming step includes the step of controlling the internal stress of the entire first and second films by adjusting the average thickness of the second film against the average thickness of the first film.

This makes it possible to form the initial holes each having a desired size with high accuracy. As a result, it is possible to control the shape of concave portions more surely.

In the etching method of the present invention, it is preferable that, in the case where the average thickness of the first film and the average thickness of the second film are respectively defined as X (nm) and Y (nm), X and Y satisfy the relation: $0.01 \leq X/Y \leq 0.8$.

By satisfying the relation, it is possible to control the internal stress of the entire film for forming the mask having the first and second films more surely and to form the initial holes each having a desired size with high accuracy.

In the etching method of the present invention, it is preferable that the internal stress of the first film in the case of forming only the first film on the substrate is in the range of −1,700 to −700 mPa.

This makes it possible to control the internal stress of the entire film for forming the mask having the first and second films more surely and to form the initial holes each having desired shape and size with higher dimensional accuracy.

In the etching method of the present invention, it is preferable that the internal stress of the second film in the case of forming only the second film on the substrate is in the range of 500 to 1,500 mPa.

This makes it possible to cancel out or reduce the internal stress of the first film more readily and to form the initial holes each having a desired size with higher dimensional accuracy.

In the etching method of the present invention, it is preferable that the internal stress of the entire first and second films is in the range of −400 to 400 mPa.

This makes it possible to form the concave portions each having a desired size with higher accuracy, and as a result it is possible to control the shape of the concave portions more surely. Further, by using the film for forming the mask having the first and second films, it is possible to improve adhesion of the mask to the substrate.

In the etching method of the present invention, it is preferable that the average thickness of the mask formed at the mask forming step is in the range of 5 to 500 nm.

By restricting the average thickness of the mask in the range mentioned above, it is easy to form the initial holes while maintaining the resistance to the etching process. As a result, it is possible to control the size of the initial holes more readily.

In the etching method of the present invention, it is preferable that the internal stress of the first film is compressive stress and the internal stress of the second film is tensile stress.

This makes it possible to form the initial holes each having a desired size with higher accuracy. As a result, it is possible to control the shape of the concave portions more surely.

In the etching method of the present invention, it is preferable that the first film is mainly constituted from CrO.

In the case where the second film is mainly constituted from Cr, it is possible to improve adhesion of the first film to the second film. Further, it is possible to improve adhesion of the first film to the substrate (in particular, in the case where the substrate is constituted from glass).

In the etching method of the present invention, it is preferable that the second film is mainly constituted from Cr.

This makes it possible to cancel out or reduce the internal stress of the first film more readily. Further, it is possible to form the initial holes readily and to improve the resistance to the etching process when the substrate is subjected to the etching process particularly.

In the etching method of the present invention, it is preferable that the etching method further includes the step of:

forming a third film before or after the first and second films forming step, wherein the plurality of initial holes are formed in the first, second and third films at the initial holes forming step.

For example, in the case where the third film is formed on the first and second films (that is, the film for forming the mask mentioned above), it is possible to protect the surface of the first and second films and to improve the resistance of the entire first and second films to the etching process. On the other hand, in the case where the third film is formed on the substrate (that is, between the substrate and the film for forming the mask (the first and second films)), it is possible to improve adhesion of the film for forming a mask to the substrate by providing the third film when the adhesion between the substrate and the film for forming the mask (the first and second films) is relatively low.

In the etching method of the present invention, it is preferable that the etching includes wet etching.

The wet etching can be carried out with simpler apparatus than dry etching. Further, the wet etching can be applied to many substrates at a time.

In the etching method of the present invention, it is preferable that an etchant used when the substrate is subjected to the wet etching at the concave portion forming step is mainly constituted from ammonium hydrogen difluoride.

Since a 4 wt % or less solution (containing 4 wt % (i.e., 4% by weight) or less of ammonium hydrogen difluoride) of ammonium hydrogen difluoride is not poison, it is possible to prevent its influence on the human body during work and on the environment.

In the etching method of the present invention, it is preferable that the diameter of the concave portion formed at the concave portion forming step is in the range of 10 to 500 μm.

By restricting the diameter of the concave portions in the range mentioned above, it is possible to apply the etching method of the present invention to the substrate more preferably.

In the etching method of the present invention, it is preferable that the concave portions are used for manufacturing microlenses.

In the case where the concave portions thus formed are used for manufacturing the microlenses, it is possible to apply the etching method of the present invention to the substrate more preferably.

In another aspect of the present invention, the present invention is directed to a substrate with a plurality of concave portions. The substrate with a plurality of concave portions is manufactured using the etching method defined as mentioned above.

Since each of the concave portions has desired shape and size in the substrate with a plurality of concave portions manufactured using the etching method of the present invention, it is possible to improve reliability of the microlens substrate manufactured using the substrate with a plurality of concave portions of the present invention.

In still another aspect of the present invention, the present invention is directed to a microlens substrate manufactured using the substrate with a plurality of concave portions defined as mentioned above.

This makes it possible to provide a microlens substrate having excellent reliability.

In yet still another aspect of the present invention, the present invention is directed to a transmission screen including the microlens substrate defined as mentioned above.

This makes it possible to provide a transmission screen having excellent reliability.

It is preferable that the transmission screen of the present invention further includes a Fresnel lens portion with a Fresnel lens, the Fresnel lens portion having an emission face and the Fresnel lens being formed in the emission face wherein the microlens substrate is arranged on the side of the emission face of the Fresnel lens portion.

This makes it possible to provide a transmission screen having excellent reliability.

In yet still another aspect of the present invention, the present invention is directed to a rear projection. The rear projection of the present invention includes the transmission screen defined as mentioned above.

This makes it possible to provide a rear projection having excellent reliability.

It is preferable that the rear projection of the present invention further includes:

a projection optical unit; and a light guiding mirror.

This makes it possible to provide a rear projection having excellent reliability.

BRIEF DESCRIPTION OF THE DRAWINGS

The foregoing and other objects, features and advantages of the present invention will become more readily apparent from the following detailed description of preferred embodiments of the invention which proceeds with reference to the accompanying drawings.

FIG. 2 is a schematic longitudinal cross-sectional view of a microlens substrate manufactured using the substrate with concave portions.

DETAILED DESCRIPTION OF THE INVENTION

A detailed description will now be given for an etching method, a substrate with a plurality of concave portions, a microlens substrate, a transmission screen and a rear projection provided with the microlens substrate of the preferred embodiments according to the present invention with reference to the accompanying drawings.

A description will first be given for the etching method of the present invention.

FIG. 1 is a schematic longitudinal cross-sectional view showing a manufacturing process in the case of applying an etching method of the present invention to formation of concave portions for forming microlenses. FIG. 2 is a schematic longitudinal cross-sectional view of a microlens substrate manufactured using the substrate with concave portions. In this regard, hereinafter, a description will be given for the case where the etching method of the present invention is applied to manufacturing of a substrate with a plurality of concave portions for forming microlenses.

First, a substrate 5 is prepared in manufacturing a substrate 2 with concave portions. It is preferable that a substrate having a uniform thickness without flexure and blemishes is used for the substrate 5. Further, it is also preferable that a substrate with a surface cleaned by washing or the like is used for the substrate 5.

The constituent material of the substrate 5 is not particularly limited. For example, alkali-free glass, soda-lime glass, crystalline glass, quartz glass, lead glass, potassium glass, borosilicate glass, or the like may be mentioned. In the case of manufacturing a microlens substrate using the substrate 2 with concave portions, alkali-free glass, soda-lime glass, and crystalline glass (for example, neoceram or the like) are preferable as the constituent material of the substrate 5. By the use of alkali-free glass, soda-lime glass, or crystalline glass, it is easy to process the material for the substrate 5, and it is possible to obtain the substrate 2 with concave portions having preferable optical properties. Moreover, since alkali-free glass or crystalline glass is relatively inexpensive, it is also advantageous from the viewpoint of manufacturing cost. Although the thickness of the substrate 5 varies depending upon various conditions such as the material constituting the substrate 5 and its index of refraction, it is generally preferable to be in the range of 0.3 to 20 mm, and more preferably in the range of 2 to 8 mm. By restricting the range of the thickness in such a range, it is possible to obtain a compact substrate 2 with concave portions for microlenses that has required optical properties.

(Film Forming Step)

Figure 1A:
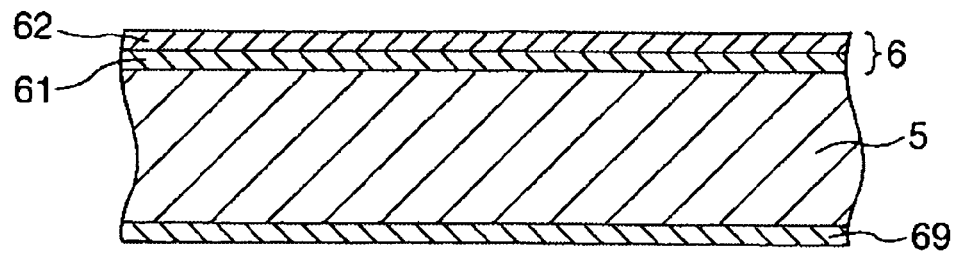
FIG. 1 is a schematic longitudinal cross-sectional view showing a manufacturing process in the case of applying an etching method of the present invention to formation of concave portions for forming microlenses.

<1> As shown in FIG. 1A, a film for forming a mask is formed on the surface of the prepared substrate 5 by laminating a first film 61 and a second film 62. To explain the step of forming the film for forming a mask more specifically, the film forming step includes a first film forming step in which the first film 61 is formed on the surface of the substrate 5 and a second film forming step in which the second film 62 is formed on the surface of the first film 61. Further, at the film forming step a rear face protective film 69 is formed on the rear face of the substrate 5 (that is, the face side opposite to the face on which the mask 6 is formed). Needless to say, the film for forming a mask and the rear face protective film 69 may be formed simultaneously.

Each of the first and second films 61, 62 has predetermined internal stress so that the internal stresses of the first and second films are canceled out or reduced with each other, and the first film 61 is adjacent to the second film 62. Further, in the present embodiment, as shown in FIG. 1A, the first film 61 is formed at the substrate 5 side compared with the second film 62. The film for forming a mask is a film to become a mask 6 at a mask forming step described later by forming a plurality of initial holes 63 with a predetermined pattern in the film for forming a mask (that is, by patterning the plurality of initial holes 63).

Meanwhile, a method of forming a plurality of concave portions for forming microlenses on a substrate by providing a mask on which a plurality of initial holes are formed on the substrate and subjecting the substrate to an etching process with the use of the plurality of initial holes formed on the mask has been already known. However, in a conventional method, it is difficult to control the shape and size of formed concave portions adequately. The inventors of the present invention thought that the shape and size of the concave portions formed on the substrate cannot be controlled adequately because the shape and size of through-holes (initial holes) provided on a film for forming a mask to form the concave portions cannot be controlled adequately.

The inventors of the present invention have persevered in keen examination and found that it is possible to form initial holes each having desired shape and size with high accuracy by controlling the internal stress of the entire film for forming a mask. In order to control the internal stress of the entire film for forming a mask, the film for forming a mask is constructed from at least first and second films each having predetermined internal stress so that the internal stresses of the first and second films are canceled out or reduced with each other and the first and second films are adjacent to each other. Further, the inventors found that it is possible to control the shape and size of the concave portions readily and surely by forming the initial holes each having desired shape and size with high accuracy. Moreover, the inventors found that it is possible to improve adhesion of the mask to the substrate by using the film for forming a mask having the first and second films. Furthermore, the inventors found that it is possible to control the side etching rate during the etching process by adjusting the internal stress of the entire film for forming a mask, and as a result it is possible to form concave portions corresponding to spherical lenses or aspherical lenses readily.

In the present embodiment, a description will be given for the case where the internal stress of the first film 61 is compressive stress and the internal stress of the second film 62 is tensile stress. In this regard, the compressive stress and the tensile stress operate (or function) so as to cancel out or reduce with each other.

It is preferable that the internal stress (compressive stress) of the first film 61 in the case of forming only the first film 61 on the substrate 5 is in the range of −1,700 to −700 mPa, and more preferably it is in the range of −1500 to −900 mPa. This makes it possible to control the internal stress of the entire film for forming the mask having the first and second films 61, 62 more surely and to form the initial holes 63 each having desired shape and size with higher dimensional accuracy.

Further, it is preferable that the internal stress (tensile stress) of the second film 62 in the case of forming only the second film 62 on the substrate 5 is in the range of 500 to 1,500 mPa, and more preferably it is in the range of 700 to 1,300 mPa. This makes it possible to cancel out or reduce the internal stress of the first film 61 more readily and to form the initial holes 63 each having a desired size with higher dimensional accuracy.

Moreover, it is preferable that the internal stress of the entire first and second films 61, 62 is in the range of −400 to 400 mPa, and more preferably it is in the range of −250 to 250 mPa. This makes it possible to form the concave portions 63 each having a desired size with higher accuracy, and as a result it is possible to control the shape of the concave portions 63 more surely. Further, by using the film for forming the mask having the first and second films 61 and 62, it is possible to improve adhesion of the mask 6 to the substrate 5.

In this regard, "internal stress" mentioned in this specification means internal stress of a substrate at room temperature in the case of forming the substrate having a diameter of 10 cm on a flat glass substrate. Further, internal stress having a negative value indicates "compressive stress", while internal stress having a positive value indicates "tensile stress".

A constituent material of the first film 61 is not particularly limited. For example, CrO, TiO, $Ta_3O_5$, NiO, TiWO and the like may be mentioned. It is preferable that the first film 61 is mainly constituted from CrO among them. In the case where the first film 61 is mainly constituted from CrO in this manner, it is possible to control the internal stress of the entire film for forming a mask more easily. Further, it is possible to form the initial holes 63 readily, and to improve resistance of the film for forming a mask to an etching process when subjecting the substrate to the etching process. Moreover, in the case where the second film 62 is mainly constituted from Cr, it is possible to improve adhesion of the first film 61 to the second film 62. Furthermore, it is possible to improve adhesion of the first film 61 to the substrate 5 (in particular, in the case where the substrate is constituted from glass).

A constituent material of the second film 62 is not particularly limited. For example, Cr, Ti, Ta, Ni, TiW and the like may be mentioned. It is preferable that the second film 62 is mainly constituted from Cr among them. This makes it possible to cancel out or reduce the internal stress of the first film 61 more readily. Further, it is possible to form the initial holes 63 readily and to improve the resistance to the etching process when the substrate is subjected to the etching process particularly.

It is preferable to control the internal stress of the entire film for forming a mask by adjusting the average thickness of the second film 62 against the average thickness of the first film 61.

It is preferable that the average thickness of the film for forming the mask is in the range of 5 to 500 nm, and more preferably it is in the range of 50 to 150 nm. This makes it possible to form the initial holes 63 each having a desired size with higher accuracy. As a result, it is possible to control the shape of the concave portions 3 more surely.

Further, it is preferable that, in the case where the average thickness of the first film and the average thickness of the second film are respectively defined as X (nm) and Y (nm), X and Y satisfy the relation: $0.01 \leq X/Y \leq 0.8$, and more preferably they satisfy the relation: $0.1 \leq X/Y \leq 0.5$. By satisfying the relation, it is possible to control the internal stress of the entire film for forming the mask having the first and second films 61, 62 more surely and to form the initial holes 63 each having a desired size with higher accuracy. If X/Y is below the lower limit given above, the internal stress of the second film 62 remains because the internal stress of the second film 62 is stronger than that of the first film 61. For this reason, the amount of side etching (etching in the side direction) is more than the amount of etching in the depth direction, or it is impossible to obtain the concave portions 3 each having a smooth outline (that is, clear and smooth shape). On the other hand, if X/Y is over the upper limit given above, the internal stress of the first film 61 remains because the internal stress of the first film 61 is stronger than that of the second film 62. For this reason, the amount of etching in the depth direction is more than the amount of side etching (etching in the side direction), or it is impossible to obtain the concave portions 3 each having a smooth outline (that is, clear and smooth shape).

It is preferable that the average thickness of the film for forming a mask (that is, the mask 6) is in the range of 5 to 500 nm, and more preferably it is in the range of 50 to 150 nm. By restricting the average thickness of the mask in the range mentioned above, it is easy to form the initial holes and it is possible to control the size of the initial holes 63 more readily. In addition, when forming the mask 6, it is possible to maintain the resistance to the etching process.

The method of forming the first and second films 61, 62 is not particularly limited. For example, a evaporation method, a sputtering method, a CVD method, a dry plating method such as an ion plating method, a wet plating method such as an electrolytic plating method and an electroless plating method, and the like may be mentioned. The method of forming the first film 61 may be different from the method of forming the second film 62, and the conditions of forming the first film 61 may be different from that of forming the second film 62.

The rear face protective film 69 is provided for protecting the rear face of the substrate 5 in the subsequent processes. Erosion, deterioration or the like of the rear face of the substrate 5 is suitably prevented by means of the rear face protective film 69. The rear face protective film 69 must not be constituted from the same material of the film for forming the mask, and it may be constituted from the same material of the film for forming the mask. In the case where the rear face protective film 69 is constituted from the same material of the film for forming the mask, it may be provided simultaneous with the formation of the film for forming the mask. In addition, since the internal stress of the rear face protective film 69 can be relatively small, it is possible to control (prevent) distortion of the substrate 5 and the like, and to form the concave portions 3 each having desired shape and size with higher accuracy.

The film for forming a mask may have a third film other than the first and second films 61, 62. In other words, the film forming step may have the step of forming the third film other than the step of forming the first and second films 61, 62. In this case, the film for forming a mask becomes a film in which the first, second and third films 61, 62, 63 are laminated. Such a third film may be provided on the second film 62 or between the first film 61 and the substrate 5 (that is, the step of forming a third film is added before or after the step of forming the first and second films 61, 62). In the case where the third film is formed on the second film 62, the third film can be mainly constituted from Au, and in this case, it is possible to protect the surface of the second film 62 and to improve the resistance of the entire the film for forming a mask to the etching process. On the other hand, in the case where the third film is formed on the substrate 5 (that is, between the substrate 5 and the first film 61, it is possible to improve adhesion of the film for forming a mask to the substrate 5 by providing the third film when the adhesion between the substrate 5 and the first film 61 is relatively low. In this regard, in the case of providing the third film, it is preferable that the third film is relatively thin. More specifically, it is preferable that the thickness of the third film is 200 nm or less.

(Mask Forming Step)

Figure 1B:
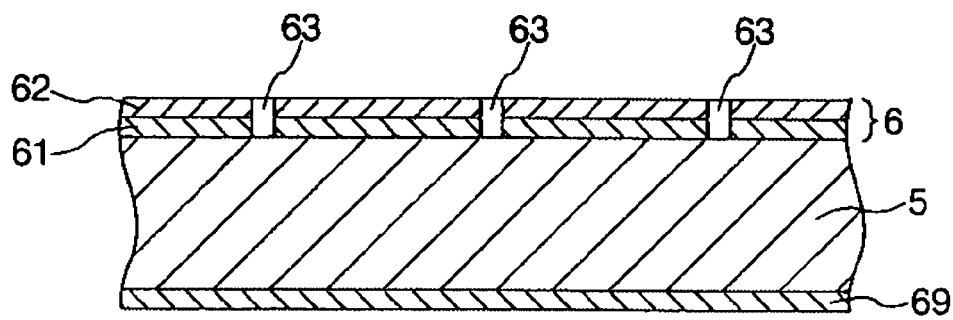

<2> Next, as shown in FIGS. 1B, the plurality of initial holes 63 that will be utilized as mask openings in the etching process (described later) are formed on the film for forming a mask with a predetermined pattern to form a mask 6 (initial hole formation process). The plurality of initial holes 63 are arranged in a matrix manner including m columns and n rows. The numbers m and n are respectively integral numbers of two or more.

The plurality of initial holes 63 may be formed in any of various methods, and for example, they can be formed by means of the physical method or irradiation with laser beams. This makes it possible to manufacture the substrate with a plurality of concave portions, for example, with a high productivity. In particular, the concave portions can be easily formed on a relatively large-sized substrate.

As for the physical methods of forming the initial holes 63, for example, blast processing such as shot blast, sand blast or the like, etching, pressing, dot printing, tapping, rubbing, or the like may be mentioned. In the case where the initial holes 63 are formed by means of the blast processing, it is possible to form the initial holes 63 with high efficiency in a shorter time even for a substrate 5 with a relatively large area (that is, area of the region for formation of the concave portions 3).

Further, in the case where the initial holes 63 are formed by means of irradiation with laser beams, the kind of laser beams to be used is not particularly limited. For example, a ruby laser, a semiconductor laser, a YAG laser, a femtosecond laser, a glass laser, a YVO$_4$ laser, a Ne—He laser, an Ar laser, a CO$_2$ laser, an excimer laser, and the like may be mentioned. Moreover, a waveform of each of the mentioned laser such as SHG (second harmonic generation), THG (third harmonic generation), FHG (fourth harmonic generation) or the like may be used for the irradiation with laser beams. In the case where the initial holes 63 are formed by means of the irradiation of laser beams, it is possible to easily and precisely control the size of the initial holes 63, a distance between adjacent initial holes 63, and the like.

It is preferable that the initial holes 63 are formed uniformly on the entire surface of the mask 6. Further, it is preferable that the average diameter of the initial holes 63 is in the range of 0.5 to 20 μm, and more preferably it is in the range of 1 to 10 μm. By restricting the average diameter of the initial holes 63 in the range described above, it is possible to apply the etching method of the present invention to the substrate 5 suitably.

(Concave Portion Forming Step)

<3> After the mask 6 is formed as described above, as shown in FIGS. 1C and 1D, a large number of concave portions 3 are formed on the substrate 5 by subjecting the substrate 5 to the etching process using the mask 6 (concave portion formation process). The etching method is not particularly limited, and a wet etching process, a dry etching process and the like may be mentioned. In the following explanation, the case of using the wet etching process will be described as a typical example.

Figure 1C:
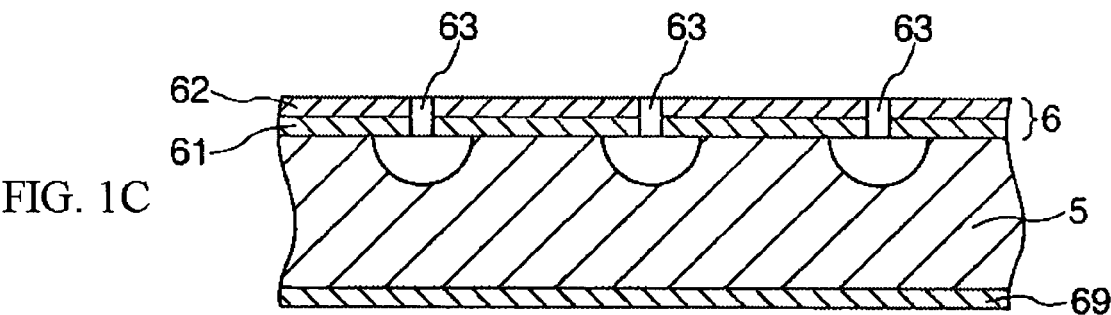
Figure 1D:
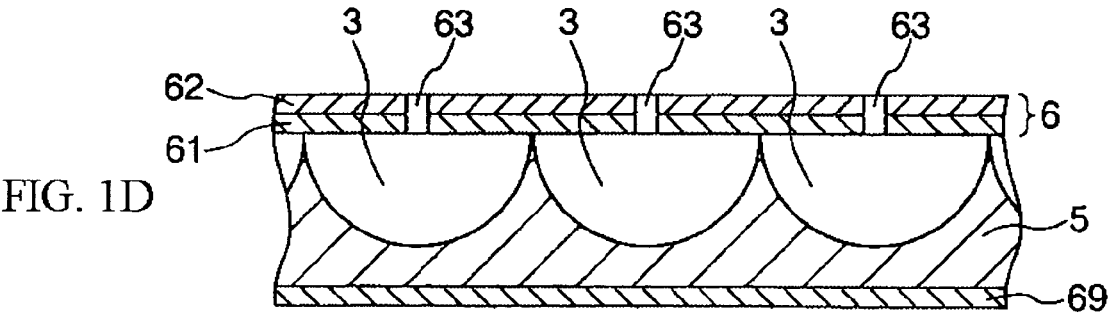

By subjecting the substrate 5 covered with the mask 6 on which the initial holes 63 are formed to the wet etching process, as shown in FIGS. 1C and 1D, the substrate 5 is eroded from the portions where no mask is present, namely, from the initial holes 63, whereby a large number of concave portions 3 are formed on the substrate 5. As described above, in the present embodiment, since the initial holes 63 are formed on the mask 6 with higher accuracy, it is possible to form the large number of concave portions 3 each having desired shape and size more surely.

An etchant for the etching process is not particularly limited. For example, an etchant containing hydrofluoric acid (hydrofluoric acid-based etchant) can be used. It is preferable that an etchant mainly constituted from ammonium hydrogen difluoride is used as the etchant containing hydrofluoric acid. Since a 4 wt % or less solution of ammonium hydrogen difluoride solution is not poison, it is possible to prevent its influence on the human body during work and on the environment more surely.

It is possible to subject the substrate 5 to the etching process by applying the etchant described above to the substrate 5 covered with the mask 6. As for a method of applying the etchant to the substrate 5, for example, a method of soaking the substrate 5 in the etchant, a method of spraying the etchant onto the substrate 5 and the like may be mentioned. It is preferable that the temperature of the etchant when subjecting the substrate 5 to the etching process is in the range of 10 to 80° C., and more preferably it is in the range of 20 to 30° C. By restricting the temperature of the etchant in the range mentioned above, it is possible to etch the surface of the substrate 5 suitably.

Further, it is preferable that a time when the substrate 5 is brought into contact with the etchant, that is, an etching time is in the range of 1 to 10 hours, and more preferably it is in the range of 2 to 5 hours. The wet etching process permits the processing with simpler equipment than in the dry etching process, and allows the processing for a larger number of substrates at a time. As a result, productivity of the substrates with concave portions can be enhanced, and substrate 2 with concave portions for manufacturing a microlens substrate can be provided at a lower cost. After the wet etching, the substrate 5 with the mask 6 is cleaned (washed) using pure water, and then drying (removal of the pure water) is carried out using N$_2$ gas.

(Mask Removing Step)

<4> Next, the mask 6 is removed from the substrate 5 as shown in FIG. 1E (mask removal process). At this time, the rear face protective film 69 is removed from the substrate 5 along with the removal of the mask 6. The removal of the mask 6 can be carried out by means of immersion (wet etching) to separating liquid such as a solution of hydrofluoric acid and nitric acid, an alkaline solution, or dry etching using CF gas, chlorinated gas or the like.

As a result of the processing in the above, as shown in FIG. 1E, a substrate 2 with concave portions having a large number of concave portions 3 on the substrate 5 is obtained. The substrate 2 with concave portions manufactured in the above method has the large number of concave portions 3 each having substantially the same shape and size. As a result, the microlens substrate manufactured using the substrate 2 with concave portions has high reliability.

It is preferable that the diameter of each of the concave portions 3 when viewed from the top of the substrate 2 with concave portions is in the range of 10 to 500 μm, and more preferably it is in the range of 30 to 200 μm. By restricting the diameter of each concave portion 3 in the above range, it is possible to apply the etching method of the present invention to the substrate 5 more suitably. Further, it is preferable that the concave portions 3 are formed on the substrate 5 with relative denseness. More specifically, it is preferable that the ratio of an area occupied by all the concave portions 3 in a usable area with respect to the entire usable area is 90% or more when viewed from the top of the substrate 2 with concave portions, and more preferably the ratio is 96% or more.

By using the substrate 2 with concave portions obtained in this manner, it is possible to manufacture a microlens substrate. For example, by filling a material having predetermined index of refractive (in particular, the index of refractive higher than that of the substrate 5) (for example, resin (adhesion) or the like) onto the concave portions 3 of the obtained substrate 2 with concave portions, it is possible to manufacture a microlens substrate 1 having a plurality of microlenses 4 as convex lenses as shown in FIG. 2.

In this regard, the substrate 2 with concave portions may be directly used as a microlens substrate 1. In this case, microlenses are constructed as concave lenses. Further, the microlens substrate 1 may be used without removing the substrate 2 with concave portions from the microlens substrate 1, or the substrate 2 with concave portions may be removed from the microlens substrate 1. The microlens substrate 1 obtained in the manner described above can be utilized as a constituent component of a transmission screen, rear projection, liquid crystal light valve of a transmission display, for example.

Next, a transmission screen 10 provided with the microlens substrate 1 described above will be described.

Figure 3:
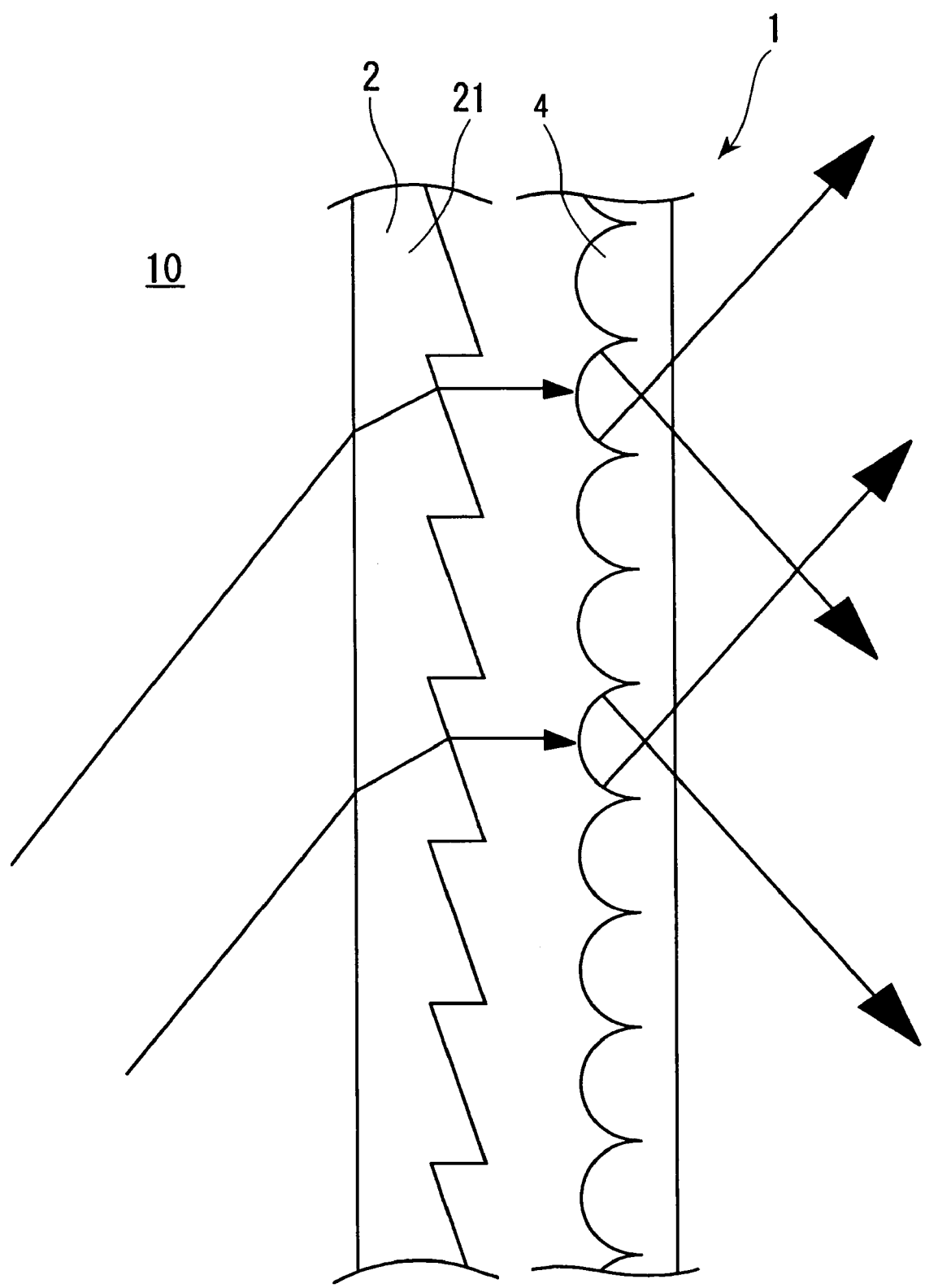
FIG. 3 is a schematic longitudinal cross-sectional view showing a transmission screen provided with the microlens substrate shown in FIG. 3 according to the present invention.

FIG. 3 is a schematic longitudinal cross-sectional view showing a transmission screen provided with the microlens substrate shown in FIG. 2 according to the present invention. As shown in FIG. 3, the transmission screen 10 is provided with a Fresnel lens portion 2 and the microlens substrate 1 described above. The Fresnel lens portion 2 is arranged on the side of the light incident face of the screen member 1 for a transmission screen (that is, on the incident side of light for an image), and the light that has been transmitted by the Fresnel lens portion 2 enters the lens substrate with straight light control portions 1A.

The Fresnel lens portion 2 is provided with a Fresnel lens 21 in which a plurality of prisms are formed on a light emission face of the Fresnel lens portion 2 in a substantially concentric manner. The Fresnel lens portion 2 deflects the light for a projected image from a projection lens (not shown in the drawings), and outputs parallel light La that is parallel to the perpendicular direction of the major surface of the microlens substrate 1 to the side of the light incident face of the microlens substrate 1.

In the transmission screen 10 constructed as described above, the light from the projection lens is deflected by the Fresnel lens portion 2 to become the parallel light La. Then, the parallel light La enters the microlens substrate 1 to be condensed by each of the microlenses 4 of the microlens substrate 1, and the condensed light is diffused, whereby an observer (viewer) of the transmission screen 10 observes (watches) the light as a flat image.

Next, a description will be given for a rear projection using the transmission screen described above.

Figure 4:
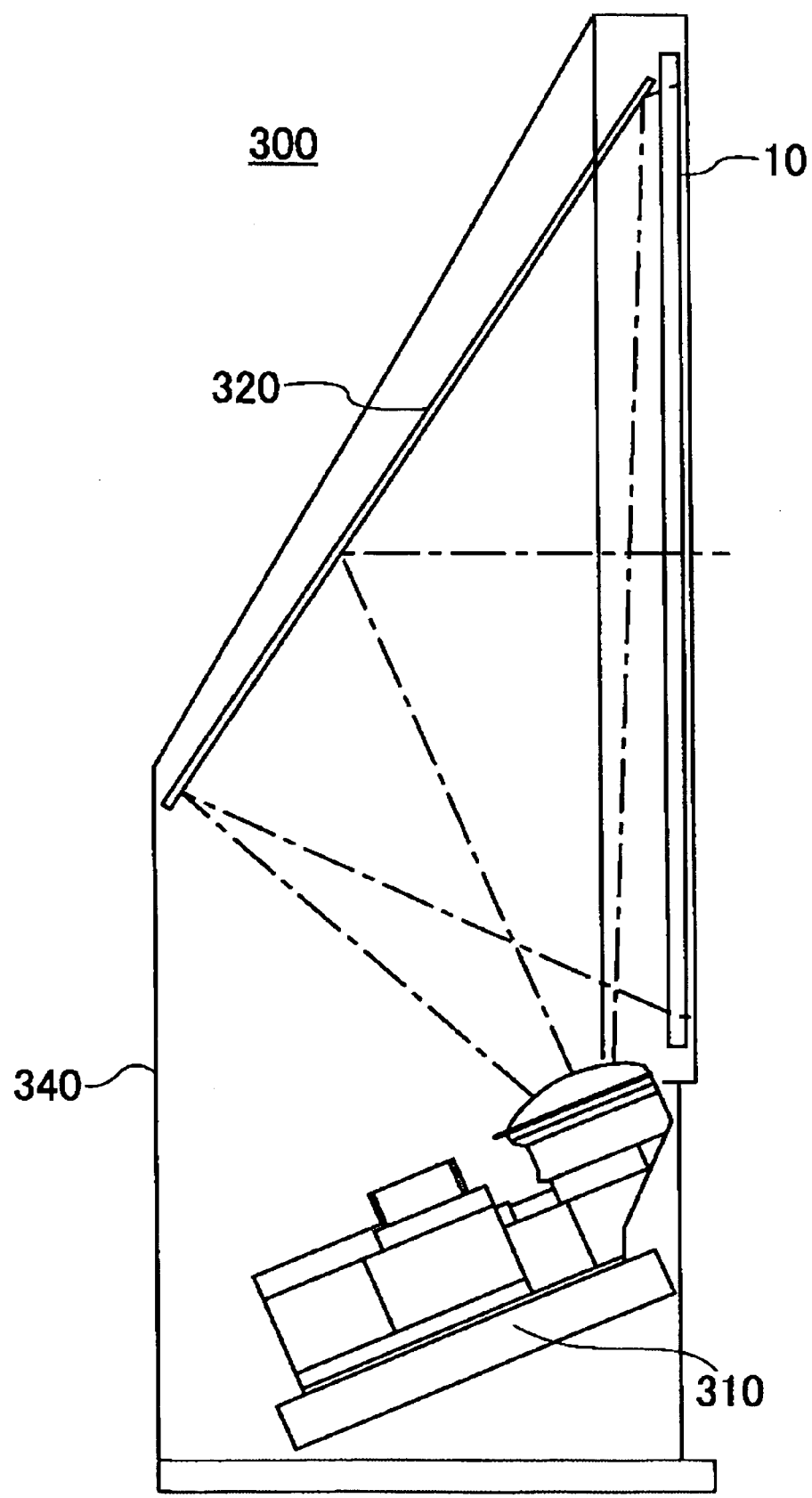
FIG. 4 is a diagram schematically showing a structure of the rear projector according to this invention.

FIG. 4 is a diagram schematically showing a structure of the rear projection according to the present invention. As shown in FIG. 4, a rear projection 300 has a structure in which a projection optical unit 310, a light guiding mirror 320 and a transmission screen 10 are arranged in a casing 340. Since the rear projection 300 uses the transmission screen 10 as described above as its transmission screen 10, it forms an excellent rear projection having a high display quality.

As described above, it should be noted that, even though the etching method, the substrate with a plurality of concave portions, the microlens substrate, the transmission screen and the rear projection provided with the microlens substrate according to the present invention have been described with reference to the preferred embodiments shown in the accompanying drawings, the present invention is not limited to these embodiments. For example, the etching method of the present invention may include any steps (processes) for an arbitrary purpose as needed.

Further, in the embodiment described above, the case where the film for forming a mask is constructed from two films, that is, the first and second films 61, 62 has been described, but the present invention is not limited thereto. For example, the film for forming a mask may have one or more film (in the Example, the third film) other than the first and second films 61, 62.

Moreover, in the embodiment described above, the case where the first film 61 was provided between the substrate 5 and the second film 62 has been described, but in the present invention the second film 62 may be provided between the substrate 5 and the first film 61. In particular, in the case where the second film 62 is provided between the substrate 5 and the first film 61, that is, for example, a film constituted from Cr (Cr film) is formed on the substrate 5 and a film constituted from CrO (CrO film) is formed on the Cr film, it is possible to prevent oxidization of Cr or the like effectively because the Cr film is covered with the CrO film.

In the present embodiment described above, the case where the substrate 5 was subjected to the etching process after forming the rear face protective film 69 on the surface of the substrate 5 has been described, but in the present invention such a rear face protective film 69 must not be formed on the surface of the substrate 5. Further, in the present embodiment described above, the case where the etching method of the present invention was applied to the formation of the concave portions for forming microlenses, but the present invention is not limited thereto. For example, the etching method of the present invention may be applied to formation of a tuning fork type crystal oscillator with photo-etching in which a crystal is formed using a Cr—Au film and a hydrofluoric acid-based etchant as a mask and an etchant, respectively.

Furthermore, in the present embodiment described above, the case where the transmission screen of the present invention was provided with the microlens substrate of the present invention and the Fresnel lens has been described, the transmission screen of the present invention is not necessarily provided with the Fresnel lens. For example, the transmission screen of the present invention may be constructed from only the microlens substrate of the present invention in practice.

Further, in the present embodiment described above, the case where the microlens substrate of the present invention was a member (component) constituting the transmission screen or the rear projection has been described, the microlens substrate of the present invention is not limited to one applied to the transmission screen or the rear projection, and it may be applied to one for any use. For example, the microlens substrate of the present invention may be applied to a constituent material of a liquid crystal light valve of a transmission display.

EXAMPLE

Example 1

A substrate with concave portions was manufactured in the following manner.

First, a soda-lime glass substrate having a rectangle of 1.2 m×0.7 m and a thickness of 5 mm was prepared. The substrate of soda-lime glass (hereinafter, which is also referred to simply as the "substrate") was immersed in a cleaning liquid (10% aqueous solution (containing a small amount of glycerin) of hydrofluoric acid heated to 30° C. to be washed, and its surface was cleaned.

A film for forming a mask constructed from a first film constituted from CrO, a second film constituted from Cr, and a third film constituted from Au was formed on the surface of the substrate that has been subjected to the cleaning process in this manner.

The formation of the first film was carried out with an ion plating method as described below. First, the substrate was placed in a treatment chamber of an ion plating apparatus, and then the inside of the treatment chamber was discharged (depressurized) to $3 \times 10^{-3}$ Pa while preheating the treatment chamber.

Subsequently, Ar gas for cleaning was introduced into the treatment chamber to carry out a cleaning process for 5 minutes. The cleaning process was carried out by applying a DC voltage of 350 V to the substrate. Then, $O_2$ gas was introduced into the treatment chamber to pressurize the inside of the treatment chamber to 53 Pa, and this condition was held for 30 minutes while applying a DC voltage of 400 V to the substrate. Under such a condition, Cr was used as a target and ionization voltage and ionization current were respectively set to 30 V and 140 A to apply them to filaments in the ion plating apparatus for 5 minutes. As a result, the first film constituted from CrO was formed on the substrate.

Next, a second film constituted from Cr was formed on the substrate on which the first film has been formed in the following manner using the ion plating apparatus. First, the inside of the treatment chamber was discharged (depressurized) to $3 \times 10^{-3}$ Pa while preheating the treatment chamber. Subsequently, Ar gas was introduced into the treatment chamber to pressurize the inside of the treatment chamber to 53 Pa, and this condition was held while applying a DC voltage of 400 V to the substrate. Under such a condition, Cr was used as a target and ionization voltage and ionization current were respectively set to 30 V and 140 A to apply them to the filaments in the ion plating apparatus for 15 minutes. As a result, the second film constituted from Cr was formed on the first film.

Next, a third film constituted from Au was formed on the substrate on which the first and second films have been formed in the following manner using the ion plating apparatus. First, the pressure inside the treatment chamber was held to 53 Pa, and a DC voltage of 400 V was applied to the substrate for 30 minutes. Under such a condition, Au was used as a target and ionization voltage and ionization current were respectively set to 30 V and 140 A to apply them to the filaments in the ion plating apparatus for 20 minutes. As a result, the third film constituted from Au was formed on the second film.

As described above, a film for forming a mask that includes the first, second and third films was formed on the substrate. The average thickness of the formed film for forming a mask was 65 nm. Further, the ratio of the average thickness of the first film to the average thickness of the second film (first film/second film) was 0.3. Moreover, the internal stress of the entire film for forming a mask was −100 mPa. In this regard, films each having a diameter of 10 cm that respectively correspond to the first and second films were separately formed on a flat glass substrate in the conditions described above. In this case, the internal stress of the first film was −1200 mPa, while the internal stress of the second film was 1000 mPa.

Next, laser machining was carried out onto the film for forming a mask, whereby a large number of initial holes were formed in a region of 113 cm×65 cm of the central portion of the film for forming a mask. As a result, a mask was formed. In this regard, the laser machining was carried out using YAG laser under the conditions of energy intensity of 1 mW, a beam diameter of 3 Mm and an irradiation time of $60 \times 10^{-9}$ sec. In this way, the initial holes were formed over the entire region of the mask mentioned above. The average diameter of the initial holes was 5 µm. The initial holes formed in this manner had minute variation in the size and shape thereof.

Next, the soda-lime glass substrate was subjected to a wet etching process, thereby forming a large number of concave portions on the soda-lime glass substrate. Each of the formed concave portions had substantially the same curvature radius (35 µm) to each other. In this regard, an aqueous solution containing 4 wt % of ammonium hydrogen difluoride and 8 wt % of hydrogen peroxide was used for the wet etching as an etchant, and the soak time of the substrate was 5 hours.

Next, the mask and the rear-face protective film were removed by subjecting the substrate to an etching process using a mixture of cerium(III) nitrate ammonium and peroxidic acid. Then, cleaning with pure water and drying with $N_2$ gas (removal of pure water) were carried out. In this way, a wafer-like substrate with concave portions in which a large number of concave portions were formed on the soda-lime glass substrate was obtained.

Example 2

A substrate with concave portions was manufactured in the manner similar to that in Example 1 described above except that a second film was formed before formation of a first film, that is, a mask was formed so that the second film in Example 1 described above was formed on the substrate and then the first film in Example 1 described above was formed on the second film.

Comparative Example 1

A substrate with concave portions was manufactured in the manner similar to that in Example 1 described above except that a film constituted from Cr was formed on the substrate as a mask. In this case, the mask constituted from Cr was formed in the following manner.

First, the substrate that has been cleaned in the manner similar to that in Example 1 was placed in a treatment chamber of an ion plating apparatus, and then the inside of the treatment chamber was discharged (depressurized) to $3 \times 10^{-3}$ Pa while preheating the treatment chamber.

Subsequently, Ar gas for cleaning was introduced into the treatment chamber to carry out a cleaning process for 5 minutes. The cleaning process was carried out by applying a DC voltage of 350 V to the substrate. Then, Ar gas was introduced into the treatment chamber to pressurize the inside of the treatment chamber to 53 Pa, and this condition was held for 30 to 60 minutes while applying a DC voltage of 400 V to the substrate. Under such a condition, Cr was used as a target and ionization voltage and ionization current were respectively set to 30 V and 140 A to apply them to filaments in the ion plating apparatus for 40 minutes. As a result, a single-layer film for forming a mask constituted from Cr was formed on the substrate. The average thickness of the film for forming a mask formed in this manner was 75 nm. Further, the internal stress of the film for forming a mask was 1000 mPa.

Then, a plurality of initial holes were formed on the film for forming a mask in the conditions similar to that in Example 1 described above to form a mask. In this regard, the initial holes formed in this manner had large variation in the size and shape thereof.

Comparative Example 2

A substrate with concave portions was manufactured in the manner similar to that in Example 1 described above except that a film constituted from CrO was formed on the substrate as a mask. In this case, the mask constituted from CrO was formed in the following manner.

First, the substrate that has been cleaned in the manner similar to that in Example 1 was placed in a treatment chamber of an ion plating apparatus, and then the inside of the treatment chamber was discharged (depressurized) to $3 \times 10^{-3}$ Pa while preheating the treatment chamber.

Subsequently, Ar gas for cleaning was introduced into the treatment chamber to carry out a cleaning process for 5 minutes. The cleaning process was carried out by applying a DC voltage of 350 V to the substrate. Then, $O_2$ gas was introduced into the treatment chamber to pressurize the inside of the treatment chamber to 53 Pa, and this condition was held for 30 to 60 minutes while applying a DC voltage of 400 V to the substrate. Under such a condition, Cr was used as a target and ionization voltage and ionization current were respectively set to 30 V and 140 A to apply them to filaments in the ion plating apparatus for 40 minutes. As a result, a single-layer film for forming a mask constituted from Cr was formed on the substrate. The average thickness of the film for forming a mask formed in this manner was 60 nm. Further, the internal stress of the film for forming a mask was −1200 mPa.

Then, a plurality of initial holes were formed on the film for forming a mask in the conditions similar to that in Example 1 described above to form a mask. In this regard, the initial holes formed in this manner had large variation in the size and shape thereof.

Comparative Example 3

A substrate with concave portions was manufactured in the manner similar to that in Example 1 described above except that a mask was formed in the following manner.

First, resist media was applied onto the substrate that has been cleaned in the manner similar to that in Example 1, whereby a single-layer resist film corresponding to the film for forming a mask of the present invention was formed. Subsequently, a large number of initial holes were formed by means of photosensitivity and development, thereby forming a mask. In this regard, the initial holes formed in this manner had large variation in the size and shape thereof. Further, the average thickness of the resist film was 800 nm, and the internal stress of the resist film was 800 mPa.

Comparative Example 4

A substrate with concave portions was manufactured in the manner similar to that in Example 1 described above except that a mask was formed in the following manner.

First, the substrate that has been cleaned in the manner similar to that in Example 1 was placed in a CVD furnace in which the temperature and pressure were respectively set to 600° C. and 80 Pa. Then, $SiH_4$ gas was supplied into the CVD furnace with a flow rate of 300 mL/minute to form a polycrystalline silicon film with a CVD method as a single-layer film for forming a mask and a rear face protective film.

Subsequently, a resist having a pattern for microlenses was formed on the formed film for forming a mask by means of a photoresist, and then the substrate with the film for forming a mask was subjected to a dry etching process by CF gas. Subsequently, by removing the resist, a mask in which a plurality of initial holes were formed on the film for forming a mask was obtained. In this regard, the initial holes formed in this manner had large variation in the size and shape thereof. Further, the average thickness of the film for forming a mask was 75 nm, and the internal stress of the film for forming a mask was −700 mPa.

(Evaluation)

The shape of each of the concave portions of the substrate with concave portions obtained in each of Examples 1 and 2 had substantially hemispherical structure with high accuracy. In addition, variation in the shape of the concave portions was small. On the other hand, in the substrate with concave portions in each of Comparative Examples, the accuracy of the shape was inferior and variation in the shape of the concave portions was large.

Further, the size of each of the concave portions of the substrate with concave portions obtained in each of Examples 1 and 2 was in step with each other. On the other hand, in the substrate with concave portions in each of Comparative Examples, variation in the size of the concave portions was large. Compared with Comparative Examples 3 and 4, adhesion of the mask of Comparative Example 4 to the substrate was better than that of the mask of Comparative Example 3. For this reason, the variation in the size of concave portions in Comparative Example 4 was relatively better than that in Comparative Example 3. However, compared with the variation in the size of the concave portions in Examples 1 and 2, the variation in the size of the concave portions was larger than that in Example 1 or 2.

What is claimed is:
1. An etching method comprising the steps of:
preparing a substrate having a first surface and a second surface opposite to the first surface;

forming a first film having predetermined internal stress on the first surface of the substrate, the first film being mainly constituted from CrO;

forming a second film having predetermined internal stress on the first film so that the internal stresses of the first and second films are canceled out or reduced with each other, the second film being mainly constituted from Cr;

forming a plurality of initial holes in the first and second films to form a mask; and forming a plurality of concave portions in the substrate at portions corresponding to the plurality of initial holes by subjecting the substrate to an etching process using the mask.

2. The method as claimed in claim 1, wherein the second film forming step includes the step of controlling the internal stress of the entire first and second films by adjusting the average thickness of the second film against the average thickness of the first film.

3. The method as claimed in claim 2, wherein, in the case where the average thickness of the first film and the average thickness of the second film are respectively defined as X (nm) and Y (nm), X and Y satisfy the relation: $0.01 \leq X/Y \leq 0.8$.

4. The method as claimed in claim 1, wherein the internal stress of the first film in the case of forming only the first film on the substrate is in the range of −1,700 to −700 mPa.

5. The method as claimed in claim 1, wherein the internal stress of the second film in the case of forming only the second film on the substrate is in the range of 500 to 1,500 mPa.

6. The method as claimed in claim 1, wherein the internal stress of the entire first and second films is in the range of −400 to 400 mPa.

7. The method as claimed in claim 1, wherein the average thickness of the mask formed at the mask forming step is in the range of 5 to 500 nm.

8. The method as claimed in claim 1, wherein the internal stress of the first film is compressive stress and the internal stress of the second film is tensile stress.

9. The method as claimed in claim 1, further comprising the step of:

forming a third film on the first surface of the substrate before the first film forming step, wherein the plurality of initial holes are formed in the first, second and third films at the initial holes forming step.

10. The method as claimed in claim 9, wherein the third film is mainly constituted from gold.

11. The method as claimed in claim 1, wherein the etching includes wet etching.

12. The method as claimed in claim 11, wherein an etchant used when the substrate is subjected to the wet etching at the concave portion forming step is mainly constituted from ammonium hydrogen difluoride.

13. The method as claimed in claim 11, wherein the etchant is constituted from ammonium hydrogen difluoride and hydrogen peroxide.

14. The method as claimed in claim 1, wherein the diameter of the concave portion formed at the concave portion forming step is in the range of 10 to 500 μm.

15. The method as claimed in claim 14, wherein the concave portions are used for manufacturing microlenses.

16. The method as claimed in claim 1, further comprising the step of:

forming a third film on the second film before the mask forming step, wherein the plurality of initial holes are formed in the first, second and third films at the initial holes forming step.

17. The method as claimed in claim 16, wherein the third film is mainly constituted from gold.

18. The method as claimed in claim 1, further comprising the step of:

forming a rear face protective film on the second surface of the substrate simultaneously with the first film forming step.

19. The method as claimed in claim 18, wherein the rear face protective film is constituted from the same material as the first film and the second film.

* * * * *